Sept. 12, 1967    M. SZABO    3,340,971
MOLDED PLASTIC HANDLE WITH HIDEAWAY LINKAGE
Filed Sept. 14, 1966    2 Sheets-Sheet 1
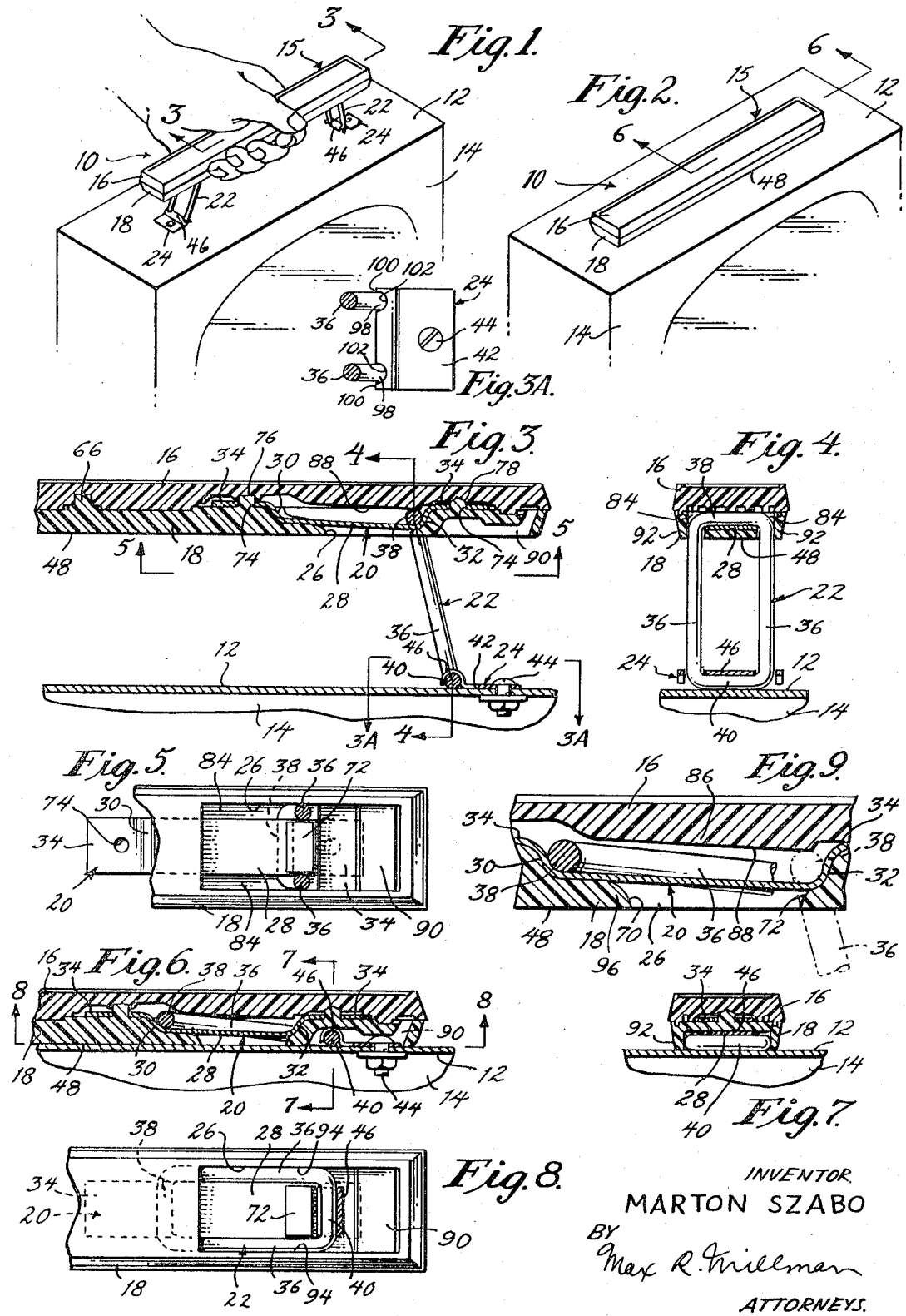
INVENTOR.
MARTON SZABO
BY
Max R. Millman
ATTORNEYS.

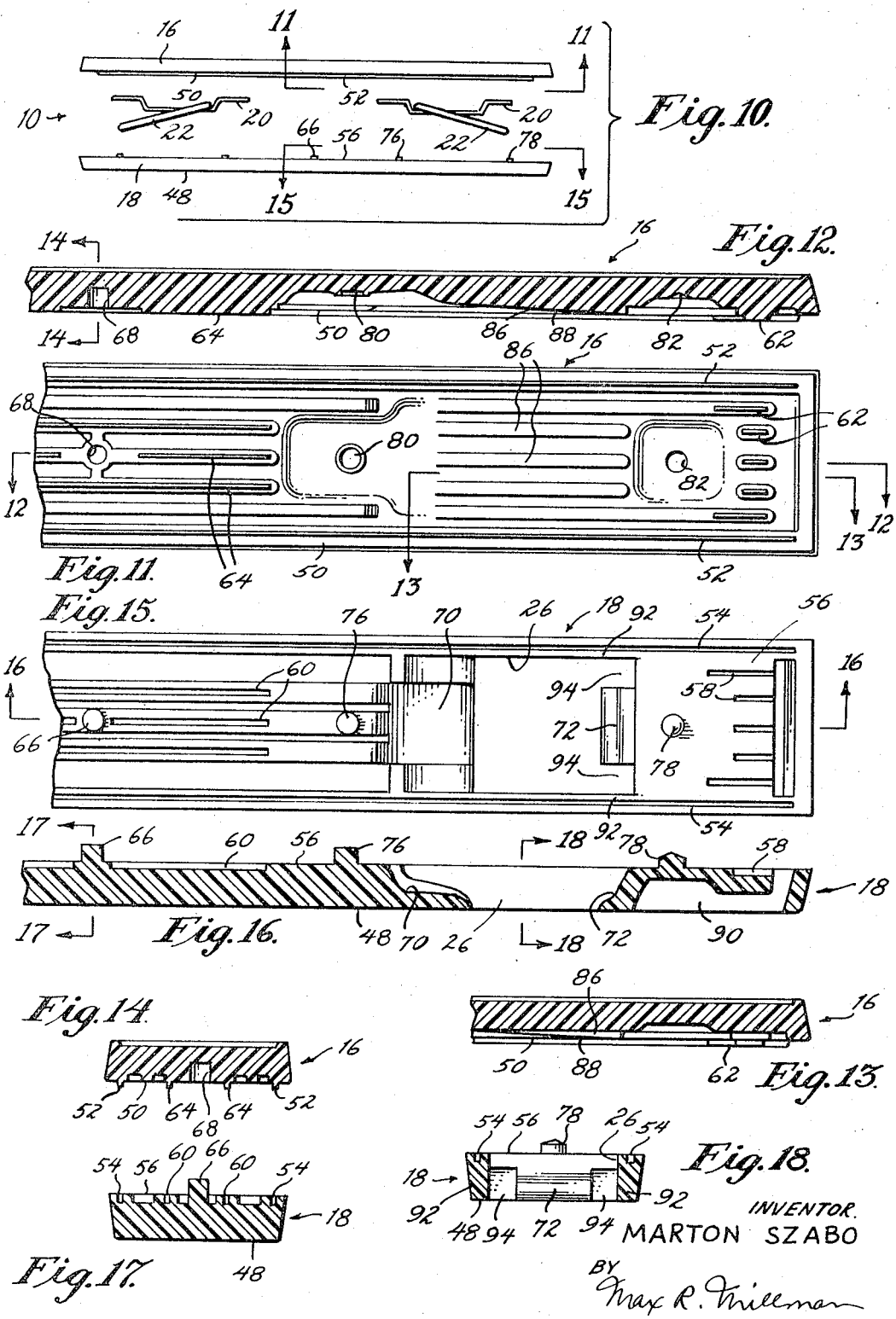

United States Patent Office 3,340,971
Patented Sept. 12, 1967

3,340,971
MOLDED PLASTIC HANDLE WITH HIDEAWAY LINKAGE
Marton Szabo, Broomall, Pa., assignor to Philadelphia Handle Company, Inc., Camden, N.J., a corporation of New Jersey
Filed Sept. 14, 1966, Ser. No. 579,275
9 Claims. (Cl. 190—58)

ABSTRACT OF THE DISCLOSURE

A collapsible self-returning handle for carrying cases which comprises a handgrip made of upper and lower plastic members with openings through the lower plastic members, guide members which are secured in place between the upper and lower plastic members when they are sealed together, each guide member including a portion which straddles each opening longitudinally, and links having side members which extend through each opening on both sides of the guide member and includes end portions, one of which is disposed slidably in the guide member and the other of which is hinged to the carrying case so that the handgrip can be readily raised to a carrying position and will smoothly return to a collapsed non-carrying position when released.

---

This invention relates to a collapsible handle for use in transporting various carrying cases, portable radios, television sets, electronic test equipment and the like of the type shown and described in my copending application Ser. No. 544,669, filed Apr. 18, 1966, wherein the handle can be lifted to a raised carrying position but is self-returning in that it falls of its own weight to a collapsed non-carrying position against the case, and in so doing conceals the handle-mounting linkage.

The primary object of the invention is to provide a handle of the character described which is fabricated of relatively few parts, the major ones being made of molded plastics, which parts can be readily and easily assembled thereby effecting considerable economies in the cost of manufacturing.

A further object of the invention is to provide a collapsible self-returning handle with hideaway mounting linkage in which the hand grip is made of molded plastic halves with means to retain them automatically in proper assembled relation to themselves and to the mounting linkage so that ultrasonic welding of the mold halves can be effected accurately and rapidly.

Another object of the invention is to provide a collapsible self-returning handle of the character described which is so constructed that a larger grip portion is available without sacrificing the ability of the handle to completely conceal the mounting linkage in the collapsed position.

Another object of the invention is to provide a handle of the character described with means to assist the self-return of the handle to its collapsed position against the case.

These and other objects of the invention will become more apparent as the following description proceeds in conjunction with the accompanying drawing, wherein:

FIG. 1 is a fragmentary perspective view of the handle mounted on a carrying case and illustrating its raised or carrying position;

FIG. 2 is a view similar to FIG. 1 illustrating the handle in its collapsed or non-carrying position;

FIG. 3 is an enlarged sectional view taken on the line 3—3 of FIG. 1;

FIG. 3A is a sectional view taken on the line 3A—3A of FIG. 3;

FIG. 4 is a sectional view taken on the line 4—4 of FIG. 3;

FIG. 5 is a sectional view taken on the line 5—5 of FIG. 3;

FIG. 6 is an enlarged sectional view taken on the line 6—6 of FIG. 2;

FIG. 7 is a sectional view taken on the line 7—7 of FIG. 6;

FIG. 8 is a sectional view taken on the line 8—8 of FIG. 6;

FIG. 9 is an enlarged detail of the insert in the handgrip showing the position of the link therein;

FIG. 10 is an exploded elevational view of the components of the handle;

FIG. 11 is an enlarged fragmentary bottom plan view of the upper half of the handgrip looking from line 11—11 of FIG. 10;

FIG. 12 is a sectional view taken on the line 12—12 of FIG. 11;

FIG. 13 is a sectional view taken on the line 13—13 of FIG. 11;

FIG. 14 is a sectional view taken on the line 14—14 of FIG. 12;

FIG. 15 is an enlarged fragmentary top plan view of the bottom half of the handgrip looking from line 15—15 of FIG. 10;

FIG. 16 is a sectional view taken on the line 16—16 of FIG. 15;

FIG. 17 is a sectional view taken on the line 17—17 of FIG. 16; and

FIG. 18 is a sectional view taken on the line 18—18 of FIG. 16.

Specific reference is now made to the drawings wherein similar reference characters are used for corresponding elements throughout.

The handle is generally indicated at 10 and is shown attached to the upper wall 12 of a television set 14 which is merely illustrative since the handle is applicable to other electronic devices, radios, test equipment, other carrying cases, luggage and the like.

As seen in FIG. 10, there are essentially a total of five components making up the handle; a handgrip 15 comprising upper and lower plastic halves 16 and 18, metal inserts or guide members 20 in the handgrip, links 22 each with an end portion slidably mounted in each insert and hardware 24 secured to the wall 12 which hinges the other end portion of each link to the case, the links passing through openings 26 in the lower half 18 of the handgrip.

Each metal insert 20 is in the form of a generally U-shaped trough having a base 28, upstanding end walls 30 and 32 and apertured lateral flanges 34 on the end walls. Each link 22 is in the form of a generally rectangular ring comprised of longitudinal side portions 36 and end portions 38 and 40 joining the side portions at their opposite ends. In final assembly, the inner end portion 38 of the link slides in the trough on the base 28 and the side portions 36 of the link straddle the base 28 of the trough and extend through the opening 26 in the lower mold half 18 of the handgrip.

The hardware 24 is preferably a member 42 which is attached to the wall 12 of the carrying case by a suitable rivet or short screw and nut 44, the member 42 including a curved portion 46 which embraces the outer end portion 40 of the link to thus hinge the link about the axis of its outer end portion 40.

When the handle is assembled and mounted on the case and the handgrip is raised to the position shown in FIG. 1, the outer end portions 40 of the links 22 pivot in the curved portions 46 of the member 42 while the inner end portions 38 of the links ride on the bottom walls 28 of the trough inserts 20 from a position adjacent the end wall 30 of the insert closest to the center of the handle to the opposite end wall 32, as seen clearly in FIG. 3, in which position the side portions 36 of the links assume generally vertical positions. When the handle is released it falls by its own weight and the inner end portions 38 of the links move over the bottom 28 of the trough inserts 20 towards the wall 30 thereof and in the collapsed position, as seen in FIGS. 6, 8 and 9, the side portions 36 assume generally horizontal positions. As will appear hereinafter, the upper and lower halves 16 and 18 of the handgrip are constructed to effect easy and accurate assembly of the parts, to make a larger grip portion available and to conceal the links 22 and the attaching members 24 when the handle is in its collapsed position as seen in FIG. 2 in which the bottom face 48 of the handgrip abuts or is closely adjacent to the wall 12 of the case.

The halves 16 and 18 are molded of suitable colored or uncolored, decorated or undecorated plastics, such for example as polystyrene and at predetermined locations the undersurfaces thereof contain elements which interfit to keep the halves in proper assembly before they are sealed together, preferably ultrasonically. Thus, in the description which follows it will be understood that the interfitting elements are reversible. Thus, the undersurface 50 of the upper half 16 contains longitudinal ribs 52 adjacent its sides which enter longitudinal grooves 54 along the sides of the undersurface 56 of the lower half 18. Similarly, longitudinally extending grooves 58 and 60 adjacent the ends and in the center of the undersurface 56 of the lower half 18 receive corresponding ribs 62 and 64 in the undersurface 50 of the upper half 16. To assist in initial assembly of the two halves, the undersurface of the lower half 18 contains a central boss or protuberance 66 which is received in a recess 68 of similar dimensions which is provided in the undersurface of the upper half 16.

The opening 26 in the lower half 18 is so formed that it includes longitudinally opposed inner and outer stepped surfaces 70 and 72 which receive the end walls 30 and 32 of the trough insert 20. The lateral flanges 34 on the walls have apertures 74 which receive protuberances 76 and 78 to hold the inserts in place, the protuberances entering recesses 80 and 82 in the upper half 16. The bottom 28 of the trough insert extends across the opening 26 but since it is not as wide, there are spaces 84 between both sides of the bottom 28 and the sides of the opening 26 through which the longitudinal portions 36 of the links 22 extend.

At a predetermined location between the recesses 80 and 82, the undersurface 50 of the upper half 16 is provided with laterally spaced longitudinally extending ribs 86 whose bottom surface 88 is inclined downwardly and outwardly towards the ends of the handgrip.

In assembly, the links 22 are placed in the trough metal inserts 20 with their inner portions 38 in the trough and their side portions 36 straddling the bottom 28. The links are made to extend through the openings 26 of the lower half 18 and the metal inserts 20 are then positioned on the lower half 18 with their apertured flanges 34 engaging the protuberances 74 and 78 adjacent both ends of the lower half. The upper half 16 is then placed over the lower half 18 with the aforementioned ribs and grooves and protuberances and recesses interfitting and the assembly subjected to ultra-sonic processing whereupon the two plastic halves are welded together. Then the free ends or members 40 of the links are hingedly secured to the case via the mounting members 24. The result is that the ribs 86 extend into the trough insert 20 above the inner end portion 38 of the link with the inclined surfaces 88 of the ribs extending downwardly and outwardly towards the outer ends of the handgrip. When the handle is raised the portions 38 of the links are adjacent the outer end walls 32 of the trough inserts and beneath the high points of the inclined surfaces 88. When the handle is released, the inclined surfaces 88 serve to cam the portion 38 of the link towards the inner wall member 30 of the trough insert, thus abetting the gravitational drop of the handle.

Towards their ends beyond the openings 26, the lower half 18 is provided with an enlarged recess 90. The stepped member 72 adjacent to it is spaced from the side walls 92 of the lower half 18 to provide recesses 94, see FIG. 18. The recesses 90 and 94 are so dimensioned that when the handle is in its collapsed position with the lower face 48 thereof against or adjacent the case wall 12, the recess 90 receives and conceals the mounting member 24 and the recesses 94 receive and conceal the outer end portions of the side members 36 of the links 22.

It should also be noted that because of the step construction 70 at the inner surface of each opening 26 and the fact that the ends of the guide trough members 20, i.e. the walls 30 and 32 and their lateral flanges 34, are also in effect of step constructions. When they are secured in place, as shown particularly in FIGS. 3, 6 and 9, the longitudinal dimension of the opening 26 is less than the longitudinal distance between the end walls 30 and 32 of the guide trough member 20. Thus, full travel of the members 38 of the links 22 can be obtained inwardly towards the inner walls 30 towards the collapsed position leaving an extra plastic portion 96 at the bottom of the handgrip adjacent the inner ends of the openings 26, thereby affording a larger gripping area.

As will be seen in FIG. 3A, the curved portions 46 of the member 42 which hingedly attaches the handle to the case each contain cut-out portions or recesses 98 on both sides thereof thereby providing laterally extending shoulders or stops 100 at predetermined locations at the top of the curved portions 46. The stops 100 are preferably at least as wide as the diameters of the longitudinal portions 36 of the links which ride in said recesses 98 when the handle is raised, the stops engaging the link portions 36 to limit their raised position to a predetermined angle (preferably 70° to the horizontal) so that the links will not overturn and, when released, the handle will fall smoothly of its own weight to the collapsed position. The stops 100 are preferably provided with curved cut-out portions 102 to limit lateral movement of the links as well.

While preferred embodiments of the invention have here been shown and described, a skilled artisan may make minor variations without departing from the spirit of the invention and the scope of the appended claims.

I claim:

1. A collapsible self-returning handle comprising upper and lower elongated plastic members having inner and outer faces and sealed at their inner faces to form a handgrip, means interengageable at said inner faces of said members to retain them in a predetermined position relative to each other when sealed, openings through the outer face of said lower plastic member adjacent its ends, elongated guide members, means securing said guide members between said inner faces of said upper and lower plastic member longitudinally across said openings, and link members extending through said openings, each having one end portion slidable in said guide members and another end portion adapted to be hingedly attached to a carrying case, each guide member being a substantially U-shaped trough which is narrower than said openings through the outer face of said lower plastic member, each link member having one end portion slidable in said trough and side portions stradding said trough.

2. The combination of claim 1 wherein said trough has end walls one towards the center of the handgrip and the other towards its end, and means projecting from the inner surface of said upper plastic member into said trough having a cam surface inclined downwardly towards the end of the handgrip and acting upon said one end portion of said link member urging it towards said one end wall of said trough at which point said handle is in the collapsed position with its handgrip adjacent the wall of a carrying case.

3. The combination of claim 1 wherein said means securing said guide members between the inner faces of said upper and lower plastic members includes protrusions extending from the inner face of one of said plastic members and lateral flanges on said end walls of said trough having apertures through which said protrusions extend.

4. The combination of claim 1 wherein each of said openings through the outer face of said lower plastic member terminates in an end wall towards the center of the handgrip of step construction, thus providing a recess longitudinally towards the center of the handgrip, said trough having one end wall which is seated in said recess so that when said one end portion of said link member is adjacent said one end wall of said trough said handle is in a collapsed position with the handgrip adjacent the wall of a carrying case, thereby providing a larger hand-gripping area.

5. The combination of claim 1 wherein said link member includes another end portion, means adapted to be attached to a wall of a carrying case including a portion journaling said other end portion of said link member, the outer face of said lower plastic member including recesses adjacent said openings therethrough adapted to receive and conceal said link members and said attaching means when the handle is in the collapsed position with said outer face of said lower plastic member adjacent the wall of a carrying case.

6. A collapsible self-returning handle comprising upper and lower elongated plastic members having inner and outer faces and sealed at their inner faces to form a handgrip, means interengageable at said inner faces to said members to retain them in a predetermined position relative to each other when sealed, openings through the outer face of said lower plastic member adjacent its ends, elongated guide members, means securing said guide members between said inner faces of said upper and lower plastic member longitudinally across said openings, and link members extending through said openings, each having one end portion slidable in said guide member and another end portion adapted to be hingedly attached to a carrying case, each link member further including longitudinal side portions connected by said end portions, members adapted to be secured to a carrying case each having an arcuate portion journaling said other end portion of said link member, and recesses in said arcuate portion receiving said longitudinal side portions of said link member, said recesses terminating in stop shoulders so positioned as to engage said longitudinal side portions when the handle is fully raised so that said longitudinal side portions extend upwardly at angles less than 90°.

7. A collapsible self-returning handle comprised of an elongated handgrip, openings through one outer face of said handgrip, elognated guide members in said handgrip having portions extending longitudinally across said openings, link members each including spaced longitudinal side portions straddling said portions of said guide members and end portions, one of which is slidably disposed in said guide member, and means hingedly securing said link members to a carrying case, each of said means including an arcuate portion journaling said other end portion of said link member and including stop shoulders engaging said longitudinal side portions of said link members when the handle is fully raised to limit the raised positions of said longitudinal side portions of said link members to angles less than 90°.

8. The combination of claim 7 and cam means projecting into said guide members acting upon said one end portion of each of said link members to urge it towards one end of each guide member in the collapsed position of the handle.

9. A collapsible handle comprising an elongated handgrip, openings through the bottom face thereof, elongated guide members in said handgrip having portions straddling said openings longitudinally and terminating in stops towards the ends of said handgrip, link members each extending through said opening and having end portions, one end portion being slidably disposed in said guide member and adapted to abut said stop when the handgrip is in its fully raised carrying position, means for hingedly mounting the other end portion of said link to a carrying case, and a recess in said handgrip between said stop and a corresponding end of said handgrip opening through said bottom face thereof and adapted to receive and conceal said mounting means when said handgrip is in its fully collapsed non-carrying position.

References Cited

UNITED STATES PATENTS 2,723,417   11/1955   Furholman _____ 16—115

FRANKLIN T. GARRETT, *Primary Examiner.*